United States Patent [19]

Hettinger, Jr.

[11] Patent Number: 4,744,883
[45] Date of Patent: * May 17, 1988

[54] PRODUCTION OF SYNTHESIS GAS AND RELATED PRODUCTS VIA THE CRACKING OF HEAVY OIL FEEDS

[75] Inventor: William P. Hettinger, Jr., Russell, Ky.

[73] Assignee: Ashland Oil, Inc., Ashland, Ky.

[ * ] Notice: The portion of the term of this patent subsequent to Aug. 19, 2003 has been disclaimed.

[21] Appl. No.: 852,070

[22] Filed: Jun. 16, 1986

Related U.S. Application Data

[63] Continuation of Ser. No. 656,832, Oct. 2, 1985, Pat. No. 4,606,811, which is a continuation of Ser. No. 403,241, Jul. 29, 1982, abandoned.

[51] Int. Cl.$^4$ ............................................. C10G 11/18
[52] U.S. Cl. ................................ 208/108; 208/113; 502/43; 518/703; 518/704
[58] Field of Search .............. 208/108, 111, 112, 113, 208/120, 950; 48/197 R; 502/43; 518/703, 704

[56] References Cited

U.S. PATENT DOCUMENTS

| | | | |
|---|---|---|---|
| 3,415,634 | 12/1968 | Dent et al. | 208/108 |
| 3,676,331 | 7/1972 | Pitchford | 208/112 |
| 3,960,706 | 6/1976 | McCollum et al. | 208/112 |
| 4,097,364 | 6/1978 | Egan | 208/111 |
| 4,244,810 | 1/1981 | Youngblood et al. | 208/120 |
| 4,291,188 | 9/1981 | Wagstaff | 585/752 |
| 4,299,687 | 11/1981 | Myers et al. | 208/113 |
| 4,316,794 | 2/1982 | Schoennagel | 208/111 |
| 4,332,674 | 6/1982 | Dean et al. | 208/120 |
| 4,348,272 | 9/1982 | Tu | 208/111 |
| 4,348,487 | 9/1982 | Goldstein et al. | 518/704 |
| 4,388,218 | 6/1983 | Rowe | 208/164 |
| 4,606,811 | 8/1986 | Hettinger | 208/108 |

FOREIGN PATENT DOCUMENTS

| | | |
|---|---|---|
| 0026645 | 9/1980 | European Pat. Off. . |
| 0073396 | 8/1982 | European Pat. Off. . |
| 2063295 | 11/1980 | United Kingdom . |

*Primary Examiner*—Olik Chaudhuri
*Attorney, Agent, or Firm*—Richard C. Willson, Jr.; James L. Wilson

[57] ABSTRACT

In a reduced crude conversion the catalyst is regenerated with mixture of oxygen-enriched gas and $H_2O$ either as steam or preferably as water to provide additional expansion and facilitate fluidization, while converting coke on catalyst to CO and $H_2$ with minimum $CO_2$ formation. The CO can be combined with hydrogen to produce methane, methanol or Fischer-Tropsch liquid hydrocarbons or can be passed through the reduced crude conversion operation as lift gas, or as cooling medium or subjected to water-gas shift to produce additional $H_2$.

8 Claims, 1 Drawing Sheet

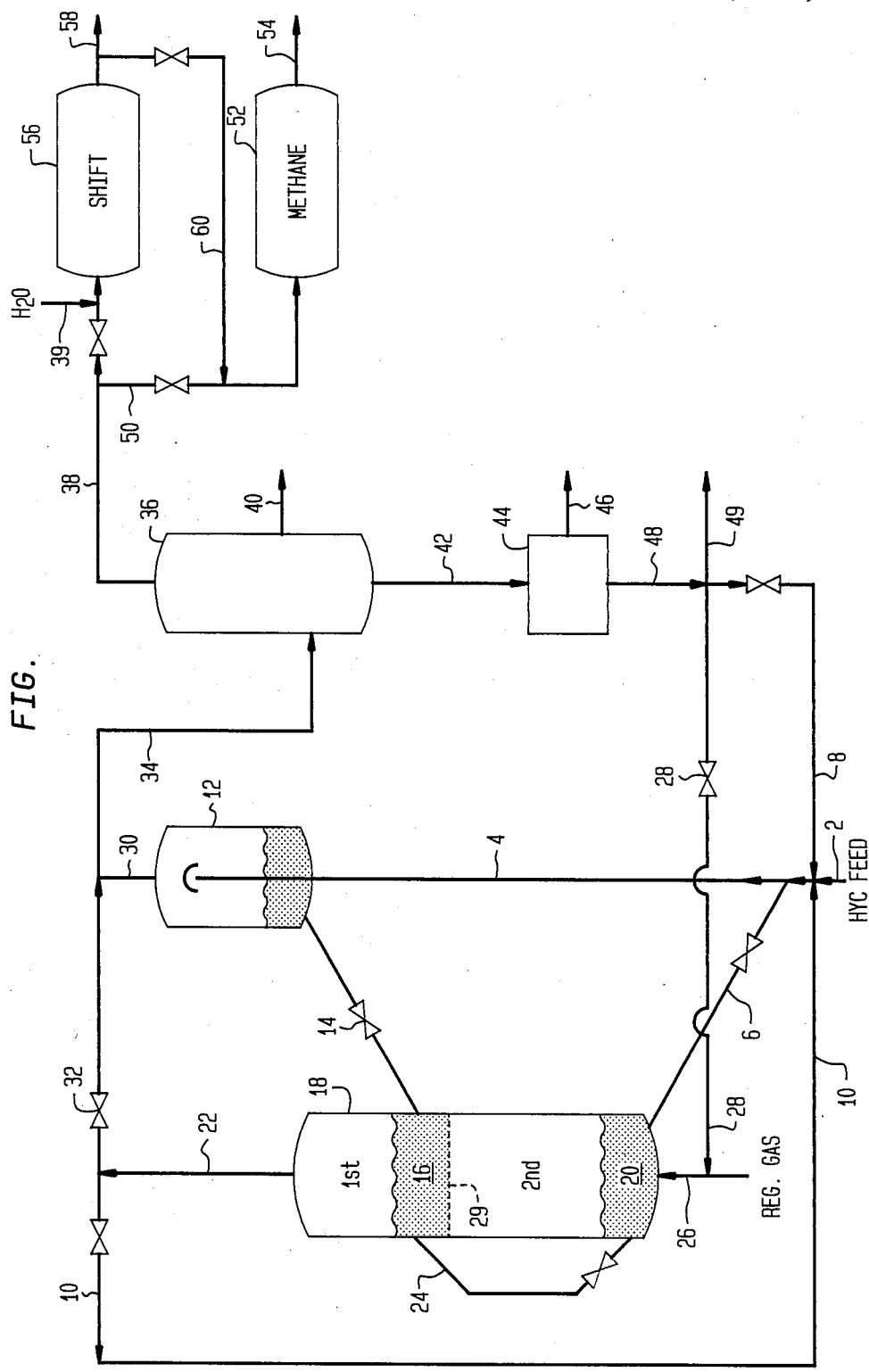

PRODUCTION OF SYNTHESIS GAS AND RELATED PRODUCTS VIA THE CRACKING OF HEAVY OIL FEEDS

This application is a continuation of application Ser. No. 656,832, filed Oct. 2, 1984, U.S. Pat. No. 4,606,811, which is a continuation application of U.S. Ser. No. 403,241, filed in the U.S. Patent and Trademark Office on July 29, 1982, now abandoned.

BACKGROUND OF THE INVENTION

The combination operation of this innovative processing sequence embodies scattered excerpts of the prior art in a synergistic relationship particularly contributing to efficient reduced crude processing.

The reaction of steam with coke on solid substrates was the subject of a paper by T. Y. Yan and M. P. Rosynek given before the American Chemical Society in September 1979, Washington Meeting. In this paper reference is made to the catalytic processing of heavy oil and residua over cracking catalysts and various schemes for removing deposited coke using steam and oxygen by referring to U.S. Pat. Nos. 3,691,063, 3,726,791 and 3,983,030.

U.S. Pat. No. 3,433,732 discloses steam reforming a heated hydrocracking catalyst to produce hydrogen and regenerate the catalyst at the same time.

U.S. Pat. No. 2,888,395 discloses a catalytic coking process whereby coked catalyst is steam reformed to produce hydrogen.

U.S. Pat. No. 2,702,267 discloses the mixing of spent and regenerated catalyst particles in a soaking zone and using hot regeneration product gases as the fluidizing and stripping gas in the soaking zone. The catalyst is regenerated at a temperature above 1400° F. with a mixture of steam and high purity oxygen comprising no more than 10 vol. % of nitrogen to produce a flue gas product comprising hydrogen, carbon oxides and excess steam. When the mixture of steam and high purity oxygen is used as the regenerating medium, the principal reactions are:

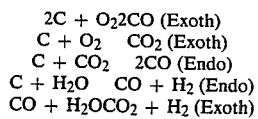

$$2C + O_2 \rightarrow 2CO \text{ (Exoth)}$$
$$C + O_2 \rightarrow CO_2 \text{ (Exoth)}$$
$$C + CO_2 \rightarrow 2CO \text{ (Endo)}$$
$$C + H_2O \rightarrow CO + H_2 \text{ (Endo)}$$
$$CO + H_2O \rightarrow CO_2 + H_2 \text{ (Exoth)}$$

To insure a high yield of hydrogen, more steam than oxygen is used.

British Pat. No. 2001545 describes a two stage regeneration operation controlled so that only partial regeneration of catalyst particles occurs in the first zone and the catalyst particles are not heated excessively and a CO flue gas is produced.

The use of $CO_2$ or steam with an oxygen containing stream is disclosed whereby a flue gas of high CO or CO-hydrogen concentration is obtained. Such a steam is valuable for use in water-gas shift to produce hydrogen. The regernation zones are positioned one above the other so that partially regenerated catalyst may flow from the upper zone to the lower zone by gravity. Regeneration gas used in the upper zone may be either $O_2$+steam, $O_2+CO_2$, $O_2$+steam+$CO_2$ depending on the composition of flue gas particularly desired. Preferably the gas charged to the second stage of regeneration is air.

U.S. Pat. No. 4,244,811 discloses the catalytic cracking of a hydrocarbon feed in the presence of water and subjecting deactivated catalyst with coke deposits to gasification conditions consisting of partial oxidative combustion to produce gas rich in CO or with the addition of steam to produce a gas rich in hydrogen or both $CO+H_2$.

U.S. Pat. No. 3,691,063 relates to a residual fuel oil hydrocracking process wherein a residuum feed is subjected to metals removal in a guard case containing an acid catalyst along with asphaltenes. The guard catalyst is regenerated with steam and oxygen to maximize hydrogen production by partial oxidation of asphaltenes. The hydrogen produced is used in the hydrocracking step. Hydrogen plus carbon monoxide from the guard chamber regeneration is fed to a two stage water gas shift operation where steam is reacted with the carbon monoxide to form additional hydrogen and carbon dioxide.

U.S. Pat. No. 3,726,791 relates to a process where high Conradson carbon feeds are coked to lay down carbon deposits on a gasification catalyst and the coked catalyst is steam gasified to produce hydrogen.

U.S. Pat. No. 3,983,030 relates to a process for demetalation and desulfurization of residua and deposited coke gasification with steam and free oxygen to produce producer gas and regenerate a porous refractory oxide used to demetallize and desulfurize the residual.

SUMMARY OF THE INVENTION

In processing a reduced crude feed or a residual oil boiling above about 650° F. comprising metal contaminants and Conradson carbon producing components, there are several significant factors one must consider and deal with in the operation. These factors include large deposition of hydrocarbonaceous material, more often referred to as coke or coke made on the catalyst, metals contaminant level, and the presence of sulfur and to a lesser extent nitrogen. The amount of coke made is a function of feed composition and severity of the hydrocarbon conversion operation. The amount of coke made also influences the regeneration operation at least with respect to the temperatures encountered to obtain desired coke removal and optimize regenerated catalyst activity, since maximum catalyst activity and selectivity should result from eliminating coke or carbon residue on the catalyst. In addition to the above it is necessary to control the deactivating effects of metal contaminants so as to minimize undesired hydrogen production at the expense of desired product and production of increased coke deposition particularly promoted by reduced metals on the catalyst. Another important factor requiring consideration is particularly concerned with controlling the emissions of sulfur oxides and nitrogen oxides or their recovery from the processing unit and particularly the regeneration operation of the process.

In the combination process of this invention it is proposed in one aspect that the spent catalyst of hydrocarbon conversion comprising carbonaceous deposits and containing hydrogen be regenerated with a mixture of oxygen rich gas greater than provided by air and water such as steam so as to facilitate the fluid catalyst regeneration while converting deposited carbonaceous material (coke) to particularly CO with the oxygen-steam mixture under conditions to restrict production of $CO_2$ to a low minimum. Thus it is proposed to realize a flue gas product of the regeneration operation comprising CO, sulfur oxides, nitrogen oxides, steam and hydrogen and some $CO_2$ absent combustion supporting amounts of oxygen with considerably enhanced regeneration temperature control. In combination with the above the flue gas thus produced is cooled and condensed to remove water, sulfur oxides and nitrogen oxides leaving a CO rich flue gas comprising come $CO_2$ and hydrogen. In one particular embodiment it is contemplated combining the CO rich flue gas of regeneration above recovered with a hydrogen rich gas product stream of an adjacent hydrocarbon conversion operation to provide a syngas product convertable to methane and/or methanol for use as herein discussed. In yet another embodiment, the CO rich flue gas above recovered is charged with the high boiling hydrocarbon feed as a fluidizing and atomizing gas to the reaction zone to help with obtaining intimate contact of the hydrocarbon with particles of catalyst in combination with reducing coke and hydrogen production as herein discussed.

The use of an oxygen enriched regeneration gas or one of high oxygen purity at least twice that of air comprising steam is instrumental in recovering a CO rich flue gas free of nitrogen oxides from the catalyst regeneration and combination operation of the invention. The recovered CO rich regeneration flue gases of lower $CO_2$ content may also be used for stripping catalyst separated from vaporous hydrocarbon products and before affecting regeneration of the stripped catalyst by the method of the invention. The hydrocarbon conversion-regeneration technique of this invention permits controlling regeneration temperatures within a relatively narrow range during reduction of deposited coke to a desired low level below 0.25 weight percent and preferably below 0.1 weight percent, reduced metals activity in the conversion zone, improves product selectivity of the hydrocarbon conversion operation, and considerably reduces the use of expensive air compressors for achieving adequate fludization of catalyst particles during regeneration thereof.

The processing combination of this invention and synergistics relationship of the combination operation to provide a more efficient-economical operation is particularly geared to processing topped crudes, reduced crudes, vacuum bottoms, heavy asphaltic crudes, coal crude oils, shale oils and tar sands oil products. The fluid catalystic cracking operation of the combination process of this invention particularly comprises an elongated riser reactor discharging into a catalyst-hydrocarbon vapor separating vessel and catalyst collecting vessel. The catalyst is separated from hydrocarbon product vapors upon discharge from the riser as by a ballistic separation technique or other suitable techniques known in the industry. The separated catalyst is collected and passed to a catalyst stripping zone and thence is passed to catalyst regeneration comprising in particular a two stage catalyst regenerated operation herein discussed. A regeneration vessel or apparatus arrangement such as provided in application U.S. Ser. No. 369,861 filed Apr. 19, 1982, and now abandoned, or that of application U.S. Ser. No. 435,836, filed Oct. 10, 1982, and now U.S. Pat. No. 4,471,063 may be employed by the method of this invention. In any one of these apparatus arrangements the spent catalyst comprising hydrocarbonaceous deposits and referred to herein as coke is charged to an upper fluid bed of catalyst particles being regenerated as herein provided. In this first stage of regeneration the spent catalyst is partially regenerated at temperatures below 1400° F. by removing from 40 to 80% of the coke deposits on the catalyst in the presence of partially spent oxygen rich regeneration gases comprising $CO_2$ recovered from a lower regeneration section as herein discussed. The partially regenerated catalyst thus obtained is then passed by gravity from the upper bed of catalyst in the first regeneration zone to a lower bed of catalyst in a second regeneration zone where it contacts fresh high purity oxygen plus steam or $O_2$ plus $CO_2$ regeneration gases or other high purity oxygen righ gas to produce a regenerated catalyst comprising residual carbon less than about 0.1 weight percent and preferably no more than about 0.05 weight percent residual carbon. Catalyst particles thus regenerated and recovered at a temperature below 1400° F. are passed to the riser cracking zone wherein the catalyst forms of suspension with a mixture of hydrocarbon feed, water and with or without a CO rich fluidizing gas obtained as herein provided to initiate a new cycle of the combination process.

The catalyst may be regenerated in a two-stage separate regenerator operation wherein the upper regenerator is supplied with steam and a gas rich in oxygen, while the lower regenerator is supplied with air, and wherein the flue gas from the lower regenerator and the flue gas from the upper regenerator are kept separate.

The fluidized gas particularly employed in the riser reactor of the combination operation of this invention is a particular regeneration flue gas product produced as herein provided and exiting from the two stage regeneration operation described. The make up of this flue gas product is controlled by the oxygen-steam-$CO_2$ content of the regeneration gas employed in the combination regeneration operation. That is the make up of the flue gas is determined by the steam-oxygen content or ratio of the regeneration gas initially charged to the bottom regeneration section and the temperature control exercised upon the dilute and dense catalyst phase thereof. For example, the use of air and a regeneration temperature equal to or less than 1350° F. will yield a CO-nitrogen containing flue gas of low $CO_2$ content. As temperatures are raised through the use of excess oxygen or CO burning in the dense or dilute catalyst phases, the flue gas will comprise $CO_2$ unconsumed oxygen and less nitrogen as regeneration air is enriched with oxygen. Thus the nitrogen content of the flue gas may be considerably reduced by using oxygen eniched air or a high purity oxygen-$CO_2$ rich stream as the regeneration gas to produce CO and/or $CO_2$ rich flue gases of low or no nitrogen oxides. Since sulfur oxides are a product of the hydrocarbon feed, little can be done except as provided herein to further reduce sulfur oxides in flue gas.

The use of a CO and/or $CO_2$ containing flue gas product of the regeneration operation as a fluidizing gas in the hydrocarbon riser reaction zone is of considerable advantage and may be used to control the hydrogen produced by catalytic conversion of the heavy hydrocarbon feed by particularly keeping the metals in the feed and deposited on the catalyst in an oxidized state which also operates to reduce the formation of carbon by reduced metals. This particular fluidizing gas composition comprising CO and $CO_2$ will also undergo to some extent the well known water gas shift reaction with water introduced with the feed at the hydrocarbon conversion conditions. Hydrogen produced by the water gas shift reaction will operate to suppress hydrogen produced by metals cracking without substantially interferring with suppression of coke formation. The CO-steam containing flue gas recovered at high regeneration temperatures up to 1400° F. may also be used as a heat sink source to supplement the endothermic heat of reaction required in the hydrocarbon riser conversion zone. This CO-steam rich flue gas may be introduced to the bottom of the riser or at one or more points along the length of the riser. In addition the CO-steam rich flue gas may be introduced to the bottom of the riser or at one or more points along the length of the riser. In addition the CO-steam containing flue gas of relatively low $CO_2$ content may be introduced to the collected catalyst following separation of hydrocarbon vapors to effect an initial high temperature stripping of the separated catalyst.

A $CO_2$ rich flue gas may be employed to strip regenerated catalyst initially contacted with high purity oxygen prior to passage thereof to the hydrocarbon conversion zone to remove oxygen from the catalyst.

In one particular embodiment, it is contemplated mixing a CO rich gas product of catalyst regeneration with or without formed hydrogen therein with a hydrogen rich gaseous product recovered from the vaporous products of hydrocarbon conversion to form a syngas mixture thereof. In this particular embodiment, light gaseous product hydrocarbons recovered from vaporous products of hydrocarbon conversion are treated to removed formed ammonia and acid components such as sulfur oxides, hydrogen sulfide to provide a light hydrocarbon stream comprising hydrogen. The hydrogen rich gases thus recovered are mixed with rich gases of the regeneration operation to form a syngas mixture charged to a methanation reactor zone, or a methanol conversion unit, to form methane and/or methanol. The exothermic reaction heat thus generated is recovered by heat exchange means not shown and/or are used with produced methane to furnish heat to the regeneration operation and/or used as fuel to furnish power to drive a gas turbine to generate compressor power.

The combination process of this invention thus contemplates the several variations herein identified and used either alone or in combination with one another to achieve the following particular operating concepts. That is, an oxygen enriched gas in combination with steam is used to regenerate catalyst under conditions to produce a CO rich flue gas containing hydrogen in combination with little $CO_2$ and very little nitrogen oxide and sulfur oxide containing materials. The flue gas thus produced is used either with or without sulfur oxides removal as fluidizing gas in a reduced crude riser conversion zone or a portion thereof is mixed with hydrogen rich product gases of the hydrocarbon conversion operation with or without gas shift, and manipulated to achieve additional hydrogen production than contributed by the hydrocarbon feed within the riser cracking zone. The syngas mixture thus obtained is subjected to a further water gas shift operation in one embodiment to produce additional syngas before converting the syngas product of the operation to methanation or methanol production. The exothermic temperature of the methanation reaction may be used to preheat gases charged to the regeneration operation and/or provide fuel for a fired turbine prime mover arrangement providing compressed regeneration oxygen containing gases.

In yet another embodiment, it is particularly contemplated stripping spent catalyst particles comprising carbonaceous deposits before oxygen combustion in admixture with hot regenerated catalyst particles to provide a mix temperature thereof within the range of 1050° F. to about 1200° F. and using as a fluidizing and stripping medium, flue gas products of regeneration of selected CO and/or $CO_2$ content obtained as provided herein. Thus the stripping medium may be selected from a number of gaseous product materials of the process comprising steam, CO, $CO_2$, and mixtures thereof particularly contributing to controlled temperature reaction of spent hydrocarbon conversion catalyst. In this operating environment the catalyst may be initially subjected to steam stripping at the temperature recovered from the hydrocarbon conversion operation and then further stripped at the higher temperature in admixture with hot regenerated catalyst particles as above discussed. The first stage of stripping may be accomplished in a dense fluid bed of catalyst external to or about the riser reactor and the second stage stripping may be accomplished in an upflowing riser contact zone or a dense fluid bed contact zone under conditions particularly encouraging the removal of insufficiently converted hydrocarbon material from the catalyst with CO, $CO_2$, steam and combinations thereof suitable for the purpose. Catalyst thus stripped is then passed to the first stage of catalyst regeneration of the two stage regeneration operation herein discussed. In this two stage regeneration, oxygen enriched air or high purity oxygen containing gas admixed with considerable steam is charged to the second stage of regeneration in an amount sufficient to achieve substantially total removal of deposited carbonaceous material from the catalyst as charged to the first stage of regeneration and product gases of the second stage regeneration operation are charged to the first regeneration stage to accomplish up to 80% removal of deposited carbonaceous material therein and produce a flue gas stream absent combustion supporting amounts of oxygen particularly comprising a CO rich flue gas stream containing steam.

BRIEF DESCRIPTION OF THE DRAWINGS

The drawing is a diagrammatic sketch in elevation of the combination process of this invention as particularly related to the catalytic conversion reduced crudes, regeneration of catalyst used therein to produce of CO rich flue gas comprising steam, the recovery of hydrogen rich gases from the products of the selective reduced crude hydrocarbon conversion operation and the generation of metane and/or methanol for use in the process from syngas products of catalyst regeneration and reduced crude conversion.

DESCRIPTION OF SPECIFIC EMBODIMENTS

Referring now to the drawing by way of example there is shown a diagrammatic arrangement of interconnected vessels or process zones for practicing the concepts of this invention particularly directed to processing reduced crudes. In the arrangement of the drawing, a reduced crude feed or other high boiling material herein identified is charged by conduit 2 to a riser reaction zone 4 wherein it contacts hot regenerated catalyst charged to riser 4 by standpipe 6. In addition thereto a condensed water product of the process which has been treated to partially remove sulfur and nitrogen cmpounds therein is charged for admixture with the feed by conduit 8. On the other hand water with some dissolved sulfur compound may be charged with advantage to the riser to suppress undesired deposited metal contaminant activity. To facilitate contact of the heavy oil feed with the catalyst as herein provided and discussed above, a special flue gas product of regeneration obtained as herein provided may also be charged for admixture with the hydrocarbon feed by conduit 10. It is to be understood that the materials charged by conduits 10, 8 and 2 do not necessarily need to meet at a common point but may be charged in a manner most expedient to achieve mixing and atomization of the charged high boiling hydrocarbon feed for dispersed phase contact with hot regenerated catalyst particles. The conversion of the hydrocarbon feed in riser 4 employing an equilibrium conversion catalyst comprising metal contaminant deposits above fresh feed catalyst up to about 30,000 ppm Ni equivalent is monitored and controlled to achieve selective conversion of the hydrocarbon feed in the presence of hydrogen generated in the operation as discussed above in a reaction time frame restricting undesired reactions promoted by reduced metal contaminants. Thus in the particular hydrocarbon conversion operation of this invention the reactants charged to a riser conversion zone to form a suspension thereof and reaction conditions maintained therein are selected to particularly achieve conversion of the feed to higher yields of more desirable lower boiling products in combination with producing a product gas of relatively high hydrogen to CO ratio. Following hydrocarbon feed traverse of the riser reaction zone in a time frame within the range of 0.5 to about 4 seconds under primarily endothermic reaction conditions to provide a riser outlet temperature within the range of 950° to 1150° F., gasiform material comprising hydrocarbon vapors is separated from entrained catalyst particles and separated catalyst particles are collected in the loweer portion of a catalyst collecting zone 12 about the upper end of the riser discharge. A fluidizing gas not shown may be charged to the bottom of a bed of collected catalyst in zone 12 to maintain it in a fluid like condition and effect some stripping of any vaporizable and strippable material from the collected catalyst. Stripping with steam, $CO_2$ or high temperature noncombustion supporting flue gas may be employed in this initial stripping of the catalyst in zone 12. Although not shown, it is contemplated employing a separate stripping zone adjacent to and below vessel 12 but in open communication therewith for effecting initial stripping of collectd catalyst particles.

It is also contemplated providing a high temperature stripping operation between the collected catalyst in zone 12 and a first stage of catalyst regeneration yet to be discussed. The high temperature stripping operation contemplated is one which mixes hot regenerated catalyst particles with spent catalyst particles in a contact zone as described in patent applications to provide a mix temperature thereof in the range of 1000° F. to abouat 1500° F. and contacting the catalyst so mixed with a stripping medium selected from the group consisting of high temperature steam, $CO_2$, non combustion supporting regeneration flue gas comprising $CO+CO_2$, steam+$CO_2$, steam+CO and steam+$CO+CO_2$. Generally the high temperature stripping operation will be accomplished at a temperature within the range of about 1100° F. up to about 1400° F.

The catalyst stripped by one or a combination of those herein discussed is passed by conduit means represented by conduit 14 of the drawing to a first stage of catalyst regeneration comprising bed 16 in the upper portion of vessel or regeneration zone 18 comprising fluid catalyst bed 20. The upper and lower regeneration zones are separated by pervious baffle or grid means through which regeneration gases may flow as herein after discussed.

In the first regeneration zone comprising fluid bed 16, the spent stripped catalyst particles comprising deactivating deposits of hydrocarbon material of hydrocarbon conversion are removed in substantial measure within the range of 40 to 80 weight percent by contact with a hot flue gas product up to about 1400° F. of the second stage of catalyst regeneration and comprising steam, CO and oxygen containing gas substantially exceeding that of air. Thus the first stage of catalyst regeneration is one which accomplishes substantial removal of hydrocarbonaceous deposits by the combination of endothermic and exothermic reactions in the presence of Ni, V and Fe, oxides and promoted by the reactions of CO and $CO_2$ with carbon, $CO_2$ with hydrogen, and oxygen with carbon and hydrogen in the presence of steam (water vapor) under temperature conditions not substantially above 1400° F. and providing a CO rich flue gas comprising steam, hydrogen, $CO_2$, sulfur and nitrogen oxides. Preferably $CO_2$ in the flue gas is kept at a low level with nitrogen oxides kept at an even lower level by employing a high purity oxygen containing gas as herein discussed. The flue gas products of the first stage of regeneration are withdrawn from zone 18 by conduit 22 for use as more fully discussed below.

Catalyst partially regenerated in bed 16 as above discussed in withdrawn by conduit 24 and discharged in bed 20. In catalyst bed 20, the partially regenerated catalyst containing residual carbonaceous material or residual coke is contacted with a steam-oxygen mixture of substantially higher oxygen purity than obtainable with air and in an amount at least equal to that required to burn hydrocarbonaceous material charged to the first stage of catalyst regeneration. The regeneration gas thus described is charged by conduit 26 to a bottom portion of catalyst bed 20 to effect removal of residual coke or carbonaceous material by burning in the presence of excess oxygen producing a flue gas product thereof comprising steam, oxygen and $CO_2$ thereby heating the catalyst to an upper temperature not exceeding about 1400° F. A water condensation product of the process obtained as hereafter discussed with some sulfur oxides therein is charged by conduit 28 for admixture with oxygen rich gas as herein provided. Catalyst regenerated as above described and comprising oxidized metal contaminants of Ni, V, Fe and Cu depending on feed source and at a desired elevated temperature and withdrawn from bed 20 by conduit 6 for return to the lower portion of riser reactor 4 and use as above discussed.

The flue gas combustion products of the second stage of regeneration and comprising steam, oxygen and $CO_2$ pass from the dispersed phase of catalyst above bed 20 through a perforated grid or baffle member 29 and into the bottom portion of bed 16 for regeneration of catalyst therein as above discussed.

A CO rich flue gas comprising steam and non combustion supporting amounts of oxygen, if any, withdrawn by conduit 22 may be passed all or in part by conduit 10 to a bottom portion of riser reactor 4 or all or a portion thereof in conduit 32 may be mixed with the gasiform product comprising hydrocarbon vapors of the riser cracking operation separated from catalyst particles and withdrawn from zone 12 by conduit 30. The gasiform product in conduit 30 with or without flue gas products in conduit 32 is passed by conduit 34 to a rough separation zone 36.

In separation zone 36 a rough separation is made between $C_2$ minus product gaseous component withdrawn by conduit 38, $C_3$ plus hydrocarbon components withdrawn by conduit 40, and a water phase comprising absorbed sulfur and nitrogen compounds withdrawn by conduit 42. The hydrocarbon product in conduit 40 is passed to fractionation equipment not shown to separate and remove gasoline boiling range material from higher and lower boiling hydrocarbon component materials. The water phase in conduit 42 is passed to a treating zone 44 wherein sulfur and nitrogen compounds are separated from the water phase and removed therefrom by conduit 46. Water thus treated is then withdrawn by conduits 48 for passage to the riser reactor 4 by conduit 8 to the regeneration operation by conduit 28 or to both of these operations as required and/or desired. Also a portion of this condensed and treated water may be withdrawn by conduit 49 for passage to shift reactor 56 discussed below.

It will thus be recognized that the hydrocarbon conversion operation and the catalyst regeneration operation are in reactant balance with one another to particularly achieve upgrading of heavy hydrocarbon materials such as reduced crudes in cooperation with particularly reducing the formation of nitrogen oxides and discharge of such with sulfur oxides in the stock gas of a catalyst regeneration operation.

The $C_2$ minus gas phase recovered from separator 36 by conduit 38 following separation of sulfur and nitrogen oxides therefrom in equipment not shown is passed by conduit 50 in a preferred embodiment to a methanation zone 52 wherein the $C_2$ minus gaseous material comprising hydrogen and CO is particularly synthesized to methane under exothermic reaction conditions. A methane rich product gas is recovered from methanation zone 52 by conduit 54 for use in providing substitute national gas.

It is further contemplated in an alternative embodiment of passing all or a portion of the product gas in conduit 38 admixed with water in conduit 39 and/or obtained from 49 to a water gas shift operation in zone 56. A product gas rich in hydrogen and comprising $CO_2$ with some (CO) carbon monoxide is recovered from zone 56 by conduit 58. This product gas may also be charged directly to riser reactor 4 by conduit means not shown for use as discussed above. On the other hand, the water gas shift product of reactor 56 is preferably passed by conduit 60 to conduit 50 and thence to the methanation zone 52 for conversion thereof to methane for utilization as suggested above.

The alternative operating concepts of this invention are synergistically related with respect to one another to particularly suppress dehydrogenation and carbonization reactions promoted by reduced metal contaminants on the catalyst from reduced crude conversion in combination with promoting hydrogenation of hydrogenation of hydrogen-deficient components of the reduced crude feed. This selective hydrocarbon conversion operation is implemented by the selective regeneration operation of this invention to the extent that deposited hydrocarbonaceous material are converted in the regeneration operation to product gases particularly useful in promoting the above desired hydrocarbon conversion operation. It will be recognized by those skilled in the art that the combination of operating embodiments herein discussed contribute measurably to the economic and efficient conversion of high boiling hydrocarbons and particularly those of high Conradson carbon producing materials. The high boiling hydrocarbons particularly suitable as high boiling feeds comprise reduced crudes, vacuum tower bottoms, resids, topped crudes and synthetic oil products of coal, shale and tar sands.

In another embodiment, CO-rich flue gas from the regenerator can be recycled to the riser cracking zone so that metal-on-catalyst will act as a hydrogenation catalyst to enhance the reaction between hydrogen produced as by-product in the riser cracking zone and CO from the flue gas. The result utilizes the CO-rich flue gas as a "getter" to reduce undesirable hydrogen formation ("gassing") in the product stream exiting from the reactor.

In other modifications, the invention may be described as follows: a reduced crude of 2, or even 4, Conradson carbon number is converted into high octane gasoline and other transportation fuels with excess heat released because of the high carbon levels of the feedstock. Excess carbon is converted by the invention to CO and $CO_2$ to balance the heat released. Excess CO is removed from the regenerator, purified and combined with hydrogen produced in the riser reactor due to the hydrogenation catalyst activity of the high metals which accumulate on the cracking catalyst because of the high metal content of the reduced crude feedstock. The resulting synthesis gas stream can be either ( a) converted to methane, methanol or Fischer-Tropsch products or (b) using oxygen-plus-steam in place of air as the feed to the regenerator, a CO-rich product is produced which can be combined with $H_2$ from the cracking operation to form methane, etc. Alternatively, oxygen and steam can be fed to the regenerator to yield CO plus $H_2$ so that the regenerator acts as a gasifier. As the $CO/CO_2$-containing flue gas additionally contains $SO_2$ it can be recycled to the reactor as a heat source and additionally to convert $SO_2$ to $H_2S$ for feed to a Claus Process sulfur removal system and the CO plus $H_2$ can yield $CH_3$ plus $H_2O$ (Towne gas) for flue.

As still an additional advantage, the $CO/CO_2$ gas helps keep the metals on catalyst in the oxidized state to deter additional coke production.

Lastly, hydrogen and carbon monoxide from the reactor can be combined with hydrogen and carbon monoxide from the regenerator and sent to a gas concentration unit to form methane.

Having thus generally discussed the processing concepts of this invention and particularly described specific embodiments in support thereof, it is to be understood that no undue restrictions are to be imposed by reasons thereof except as defined by the following claims.

What is claimed is:

1. In a process for cracking a heavy oil feed having a Conradson carbon number above 2 wt. % and being a member selected from the group consisting of topped crudes, reduced crudes, vacuum bottoms, heavy asphaltic crudes, coal crude oils, shale oils, and tar sands oil products, which process comprises contacting in a riser cracking zone said heavy oil feed with a fluid hydrocarbon cracking catalyst to form products comprising gasoline and coke on catalyst, said coke containing hydrogen, and thereafter regenerating said catalyst in a regeneration zone by removing at least a portion of said coke to provide as regenerated catalyst, and passing said regenerated catalyst to said cracking zone, the improvement which comprises:

A. cracking said heavy oil feed in a progressive flow riser cracking zone at an outlet temperature of about 950° F. to 1150°0 F. in the substantial absence of added molecular hydrogen and for a period of time within the range of 0.5 second to 4 seconds and in the presence of said catalyst, a first water condensation product, and a first CO-rich flue gas to produce a coked catalyst and a gasiform effluent comprising hydrocarbon products, a second water condensation product, and a hydrogen-rich gaseous product comprising gaseous hydrocarbons, hydrogen, ammonia, and acidic components;

B. separating said coked catalyst from said gasiform effluent and regenerating said coked catalyst in a regeneration zone consisting of a first regeneration stage and a second regeneration stage, wherein said coked catalyst enters said first regeneration stage and is contacted with steam and second-stage flue gas from said second regeneration stage, said second-stage flue gas containing less than stoichiometric amounts of oxygen to provide a partially regenerated catalyst and a second CO-rich flue gas comprising sulfur oxides, the temperature in said first regeneration stage being sufficient to support endothermic removal of coke, and said partially regenerated catalyst subsequently enters said second regeneration stage and in said second regeneration stage is contacted with a high purity oxygen-rich gas to produce catalyst further reduced in residual coke for recycle to said riser cracking zone and to produce said second-stage flue gas;

C. separating said gasiform effluent into said hydrocarbon products, said hydrogen-rich gaseous product, and said second water condensation product;

D. treating said hydrogen-rich gaseous product to remove said ammonia and said acidic components therefrom and to provide a purified hydrogen-rich gaseous product;

E. dividing said second CO-rich flue gas into a first portion of CO-rich flue gas and a second portion of CO-rich flue gas, removing sulfur oxides from said first portion of CO-rich flue gas to form a purified CO-rich flue gas, and sending said second portion of CO-rich flue gas to said riser cracking zone as said first CO-rich flue gas;

F. recycling said second water condensation product to a lower portion of said riser cracking zone, said second water condensation product becoming said first water condensation product in said riser cracking zone; and G. combining said purified hydrogen-rich gaseous product and at least a portion of said purified CO-rich flue gas to produce a synthesis gas comprising hydrogen and carbon monoxide.

2. The process of claim 1, wherein the hydrogen and carbon monoxide of said synthesis gas are reacted to produce methane.

3. The process of claim 1, wherein the hydrogen and carbon monoxide of said synthesis gas are reacted to produce methanol.

4. The process of claim 1, wherein the hydrogen and carbon monoxide of said synthesis gas are reacted in a Fischer-Tropsch process to produce Fischer-Tropsch products.

5. The process of claim 1, wherein steps E. and G. are replaced by the following: removing sulfur oxides from said second CO-rich flue gas to form a purified CO-rich flue gas, dividing said purified CO-rich flue gas into a first portion of purified CO-rich flue gas and a second portion of purified CO-rich flue gas, combining said first portion of purified CO-rich flue gas with said purified hydrogen-rich gaseous product to produce a synethesis gas comprising hydrogen and carbon monoxide, and sending said second portion of purified CO-rich flue gas to said riser cracking zone as said first CO-rich flue gas.

6. The process of claim 5, wherein the hydrogen and carbon monoxide of said synthesis gas are reacted to produce methane.

7. The process of claim 5, wherein the hydrogen and carbon monoxide of said synthesis gas are reacted to produce methanol.

8. The process of claim 5, wherein the hydrogen and carbon monoxide of said synthesis are reacted in a Fischer-Tropsch process to produce Fischer-Tropsch products.

* * * * *